United States Patent [19]
Grivel et al.

[11] Patent Number: 5,800,945
[45] Date of Patent: Sep. 1, 1998

[54] SEALED ONE-PIECE BATTERY HAVING AN ALKALINE ELECTROLYTE

[75] Inventors: Tristan Grivel; Roelof Verhoog, both of Bordeaux, France

[73] Assignee: Saft, Romainville, France

[21] Appl. No.: 626,607

[22] Filed: Apr. 2, 1996

[30] Foreign Application Priority Data

Apr. 3, 1995 [FR] France .................. 95 03899

[51] Int. Cl.$^6$ .................................. H01M 2/02
[52] U.S. Cl. .................................. 429/176
[58] Field of Search .................. 429/175, 176

[56] References Cited

U.S. PATENT DOCUMENTS

| | | | |
|---|---|---|---|
| 3,816,181 | 6/1974 | Buckenthal | 429/176 X |
| 3,856,175 | 12/1974 | Dunlop | 429/176 X |
| 3,972,737 | 8/1976 | Sullivan et al. | 429/176 |
| 4,006,037 | 2/1977 | Tirpak et al. | 429/176 |

FOREIGN PATENT DOCUMENTS 0 596 778 A1  5/1994  European Pat. Off. .
0 669 663 A1  8/1995  European Pat. Off. .

OTHER PUBLICATIONS

*Patent Abstracts of Japan*, vol. 013, No. 383 (E-811) 24 Aug. 1989 corresponding to JP-A-01 134874 (Showa Denko KK) dated May 26, 1989.
*Patent Abstracts of Japan*, vol. 008 No. 149 (E-255) 12 Jul. 1984 corresponding to JP-A-59 056351 (Nihon Denchi KK) dated Mar. 31, 1984.

*Primary Examiner*—Stephen Kalafut
*Attorney, Agent, or Firm*—Sughrue, Mion, Zinn, Macpeak & Seas, PLLC

[57] ABSTRACT

The present invention relates to a sealed one-piece battery having an alkaline electrolyte and comprising a container made of at least two mutually-cooperating parts suitable for being bonded together by contact heat-fusion and made of a thermoplastic material comprising an alloy of at least two polymers, including not less than 50% of a first polymer selected from polyamide 6 and polyamide 6—6; and not more than 50% of a second polymer selected from polyethylene, polypropylene, and copolymers thereof; said material having permeability to hydrogen no greater than 400 cm$^3$/m$^2$ 0.24 h.

7 Claims, 2 Drawing Sheets

SEALED ONE-PIECE BATTERY HAVING AN ALKALINE ELECTROLYTE

The present invention relates to a sealed one-piece battery having an alkaline electrolyte. A one-piece type battery of storage cells has a single container which is generally prismatic in shape and which includes compartments separated by partitions, with the storage cells being placed in the compartments. Such batteries have capacities lying in the range 10 Ah to 250 Ah, and an energy density of greater than 55 Wh/kg.

BACKGROUND OF THE INVENTION

The alkaline storage batteries presently on the market are either of the "open" type that permit gases to be exchanged with the ambient medium, or else they are of the "sealed" type having a valve and no exchange with the outside in normal operation. Most "sealed" type batteries are mainly designed to be incorporated in portable appliances. They are therefore of small size and limited capacity. In order to protect the user against possible excess pressure, they are preferably cylindrical in shape and their containers are made of metal. Such containers are expensive and heavy, thereby penalizing battery energy density.

Storage batteries of the "open" type, so do not run the risk of excess pressure, are prismatic in shape and possess a container made of a thermoplastic synthetic material of lighter weight, thereby enabling high energy densities to be achieved. Batteries of that type need to have their electrolyte level periodically readjusted because of losses by electrolysis and by evaporation due to contact with the ambient medium. The users of "open" type batteries are demanding more and more that such batteries should not require maintenance. By eliminating gas exchanges with the outside, such batteries have become batteries of the "sealed" type. This gives rise to a problem of ensuring that they really are sealed against gas exchange, particularly in the presence of moderate internal excess pressure.

The first batteries of that type, used in particular in railway applications, had a polypropylene (PP) container, but that solution was abandoned in more exacting applications because of the gas permeability of that material. The containers of batteries intended more particularly for aviation applications, were made of polyamide 11 (PA 11) having the chemical formula $(-NH-(CH_2)_{10}-CO-)_n$, obtained by polycondensation of aminoundecanoic acid. That material is expensive and gives rise to a resource problem because of its vegetable origin (castor oil plant beans), and its gas tightness is still insufficient.

The main condition for battery gas tightness is the intrinsic imperviousness to gas of the material constituting the container. The length of time for which a "sealed" type nickel battery can be used depends on maintaining balanced operation. If the material used for making the container is not impervious both to oxygen and to hydrogen, then there will be water loss, and thus a shortening of the lifetime of the battery. Even if the material is permeable to only one of those two gases, then the operating profile of the negative electrode is altered and that gives rise to a loss of capacity and to a reduction in lifetime. Imperviousness to hydrogen is also an essential condition for operation of batteries based on the nickel-(metal)hydride couple.

Naturally, the gas tightness of a battery container also depends on the quality of the sealing at connections between the various parts making it up. For such batteries, connections between the parts of the container are made by heat-fusing. Other bonding methods are less reliable (e.g. adhesive), or are unsuited to parts of complex shape (e.g. ultrasound welding). Heat-fusing may be achieved by contact or by thermal radiation. When the container is made of PA 11, heat-fusing can be performed industrially only by radiation and the resulting connection is less gastight. The surfaces of the parts are heated irregularly because their positioning relative to the target is necessarily inaccurate given the complex shape of the container of a one-piece battery. In addition, from the industrial point of view, that method presents a safety hazard for the operator given that the operating temperature is at around 500° C.

OBJECT AND SUMMARY OF THE INVENTION

The object of the present invention is to provide a one-piece battery having high energy density in which gas tightness relative both to oxygen and to hydrogen is considerably improved relative to known solutions.

To this end, the present invention provides a sealed one-piece battery having an alkaline electrolyte, comprising a single container including compartments receiving storage cells and made up of at least two mutually-cooperating parts made of thermoplastic material and suitable for being bonded together by contact heat-fusion, wherein said material comprises an alloy of at least two polymers comprising:

a proportion of not less than 50% by weight of the alloy of a first polymer selected from polyamide 6 and polyamide 6—6; and a proportion of not more than 50% by weight of the alloy of a second polymer selected from polyethylene, polypropylene, and copolymers -thereof; said material having permeability to hydrogen no greater than 400 $cm^3/m^2$ 0.24 h, said permeability being measured at 25° C. on a film that is 100 µm thick under an absolute pressure of 2 bars, and in an atmosphere at 75% relative humidity.

The material of the container comprises a polymer alloy. A polymer alloy is defined as a mixture of at least two mutually incompatible polymers to which a compatibility agent is added in order to confer the required uniformity to the mixture.

The first polymer is selected from polyamide 6 and polyamide 6—6. It is also possible to use an alternating or block sequenced polyamide copolymer, optionally a graft copolymer.

The chemical formula of polyamide 6 or polyaminocaprolactam is $(-NH-(CH_2)_5-CO-)_n$. It is obtained by reacting caproic acid with hexamethylene diamine. It is a material which, when used on its own, presents large dimensional variations in the presence of moisture.

The chemical formula of polyamide 6—6 is $(-NH-(CH_2)_6-NH-CO-(CH_2)_4-CO-)_n$. It is obtained by reacting adipic acid with hexamethylene diamine.

The proportion of the first polymer is not less than 50% by weight of the alloy, and preferably lies in the range 50% to 80%.

The second polymer is selected from polyethylene $(-CH_2-CH_2-)$, polypropylene $(-CH_2-CH(CH_3)-)$, and an alternating or block sequenced copolymer of polyethylene and/or polypropylene, optionally a graft copolymer.

The proportion of the second polymer is not more than 50% by weight of the alloy, and preferably lies in the range 20% to 50%.

When observed in a transmission electron microscope, this material is in the form of a dispersion of polyolefin in the polyamide matrix. The polyolefin phase is in the form of regular nodules in the range 0.1 µm to 5 µm. The material may also contain electrically non-conductive additives for improving its properties, e.g. glass fibers or beads, silica, clay.

The hydrogen permeability of the material must be no greater than 400 cm$^3$/m$^2$ 0.24 h, measured at 25° C. on a film that is 100 µm thick with a relative pressure of 1 bar and in an atmosphere at 75% relative humidity. By way of comparison, the minimum values obtained with respect to hydrogen and under the same conditions respectively for PA 11 and for PP are 2000 cm$^3$/m$^2$ 0.24 h and 9200 cm$^3$/m$^2$ 0.24 h.

For the storage battery of the invention to operate satisfactorily, it is preferable for the oxygen permeability of the material to be no greater than 150 cm$^3$/m$^2$ 0.24 h, measured at 25° C. on a film that is 100 µm thick under relative pressure of 1 bar and an atmosphere at 75% relative humidity. By way of comparison, the minimum values with respect to oxygen obtained under the same conditions for PA 11 and PP are respectively 500 cm$^3$/m$^2$ 0.24 h and 2300 cm$^3$/m$^2$ 0.24 h.

Preferably, the material is selected from materials sold under the trademark "ORGALLOY".

Parts making up the container are formed by injecting the material in the molten state under pressure. The parts are bounded together by contact heat-fusion. This technique consists in preheating the two surfaces to be bonded together up to softening temperature by direct contact with a heating tool, and then clamping them together immediately after the heating tool has been withdrawn. Heat transfer between the tool and the parts takes place by conduction, and therefore in depth. The time between heating and the application of assembly pressure must be as short as possible to avoid cooling of the molten polymer surface. The heating tool generally has electrical resistance elements (a hot mirror) and it is fitted with a temperature regulator.

The combination of the two characteristics of the material, namely its intrinsic imperviousness and its suitability for contact heat-fusion is the only way of achieving satisfactory gas tightness for the container, which is necessary if the battery is to have a long lifetime in use.

It is preferable for the force required to break the self-bond of said material as obtained by contact heat-fusion to be not less than 1.34±0.04 kN measured in a direction perpendicular to the bond on a test piece having a thickness of 2 mm, a width of 20 mm and a length of about 200 mm. To perform testing, two square plates of thickness 2 mm and of side approximately equal to 100 mm are taken from the material. They are contact heat-fused edge to edge. A test piece of width 20 mm and of length about 200 mm is then cut out across the bond so that its size in the direction perpendicular to traction is 20 mm.

Under the same conditions, a force of 0.75 kN is measured on PP, i.e. only 56% of the force required for breaking the bond in the material of the invention.

The container of the present invention has the advantage of being chemically inert relative to the electrolyte which mainly contains at least one alkaline hydroxide such as potassium hydroxide KOH, sodium hydroxide NaOH, or lithium hydroxide LiOH, together with other additives, such as wetting agents, for example. It also has the advantage of being a good electrical insulator, of having good dimensional stability in the presence of moisture, of withstanding shocks, and of withstanding temperatures of up to 1000° C. In addition the material is lightweight (density=1.03 g/cm$^3$), easy to shape industrially, in particular by injection, and moderate in cost.

Such a battery is particularly suited for use as a source of energy in a self-propelled vehicle. The container material has the advantage of being chemically insensitive to the various fluids present, such as the liquid in the breaking circuit, for example.

BRIEF DESCRIPTION OF THE DRAWINGS

The invention will be better understood and other advantages and features will appear on reading the following description given in non-limiting manner with reference to the accompanying drawings, in which.

MORE DETAILED DESCRIPTION

Figure 1:
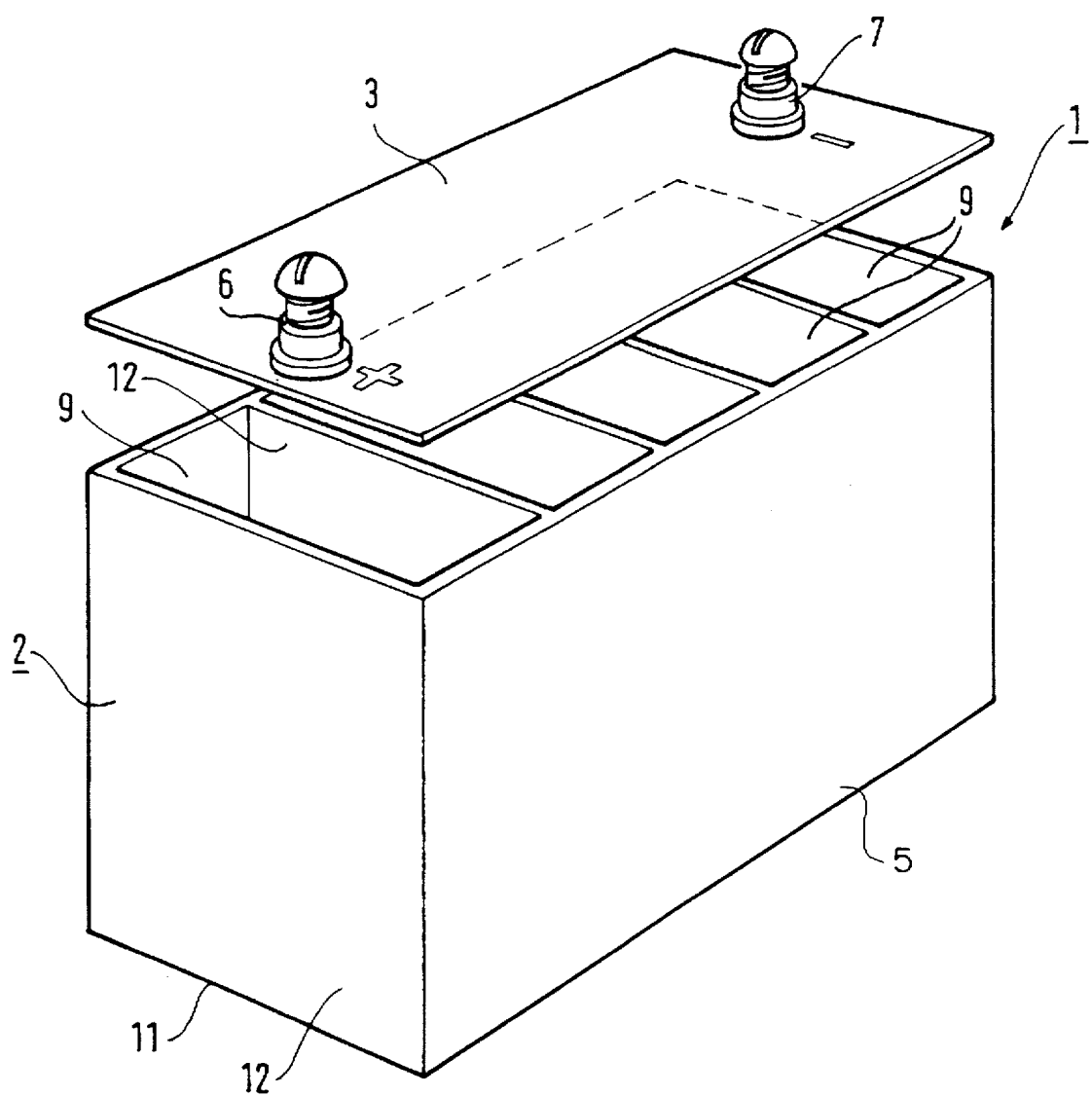
FIG. 1 shows a one-piece storage battery of the present invention.

FIG. 1 shows a one-piece storage battery of the present invention having a capacity of 120 Ah and a voltage of 6 V. It comprises a container 1 made up of a case 2 and a cover 3. The cover 3 carries the positive and negative terminals 6 and 7. The case has side walls 5, a bottom 11, and end walls 12 of a thickness lying in the range 1.5 mm to 3 mm. The storage cells are received in compartments 9 defined by the end walls 12.

The material used comprises an alloy based on polyamide 6 and on polypropylene that is sold under the trademark "ORGALLOY" and the reference "RS 6000". The parts 2 and 3 making up the container 1 are made by injecting the material in the molten state under pressure at a temperature lying in the range 240° C. to 290° C. These parts are subsequently assembled together by heat-fusing using direct contact, i.e. they are brought into contact with the surface of a heating tool, the tool is withdrawn, and the molten zones are pressed against each other.

One-piece batteries of the invention are always provided with support means while they are in use. In the present case, the mechanical strength of the material is therefore not a critical parameter.

In order to verify the gas tightness of the container made in this way, tests have been performed on oxygen tightness and on hydrogen tightness under conditions corresponding to three modes of use of the storage battery.

During storage at a mean temperature of 30° C. with the inside of the container initially having a partial pressure of oxygen equal to zero and a partial pressure of H$_2$ less than 0.4 bars, the maximum hydrogen loss rate was 1.3 cm$^3$/24 h, whereas it is accepted that the loss rate which guarantees a lifetime of not less than 5 years is 1.5 cm$^3$/24 h. The water loss rate was 0.0026 cm$^3$/24 h, to be compared with acceptable leakage of 0.0041 cm$^3$/24 h. Simultaneously, oxygen entered at a rate of 0.05 cm$^3$/24 h.

A test was performed at a mean temperature of 40° C. The partial pressures inside the container were 0.4 bars absolute for hydrogen and 0.1 bars absolute for oxygen. The maximum hydrogen leakage rate was 1.5 cm$^3$/24 h and the water loss rate was 0.028 cm$^3$/24 h.

During a test under real conditions of use, including cycling and storage, the total volume of hydrogen leakage averaged over 365 days lay in the range 0.26 cm$^3$/day for mere storage at −10° C. to a maximum of 1.2 cm$^3$/day in use.

By way of comparison, tests have been performed on the permeability of the material itself in comparison with prior art materials. Measurements were performed using a helium leakage tester referenced "ASM 181T" for 24 hours. A sample of PP was tested (volume 841.5 cm$^3$ and surface area 580.5 cm$^2$) together with a sample of PA 11 and a seample of the material of the invention (volume 560 cm$^3$ and surface area 516 cm$^2$).

Figure 2:
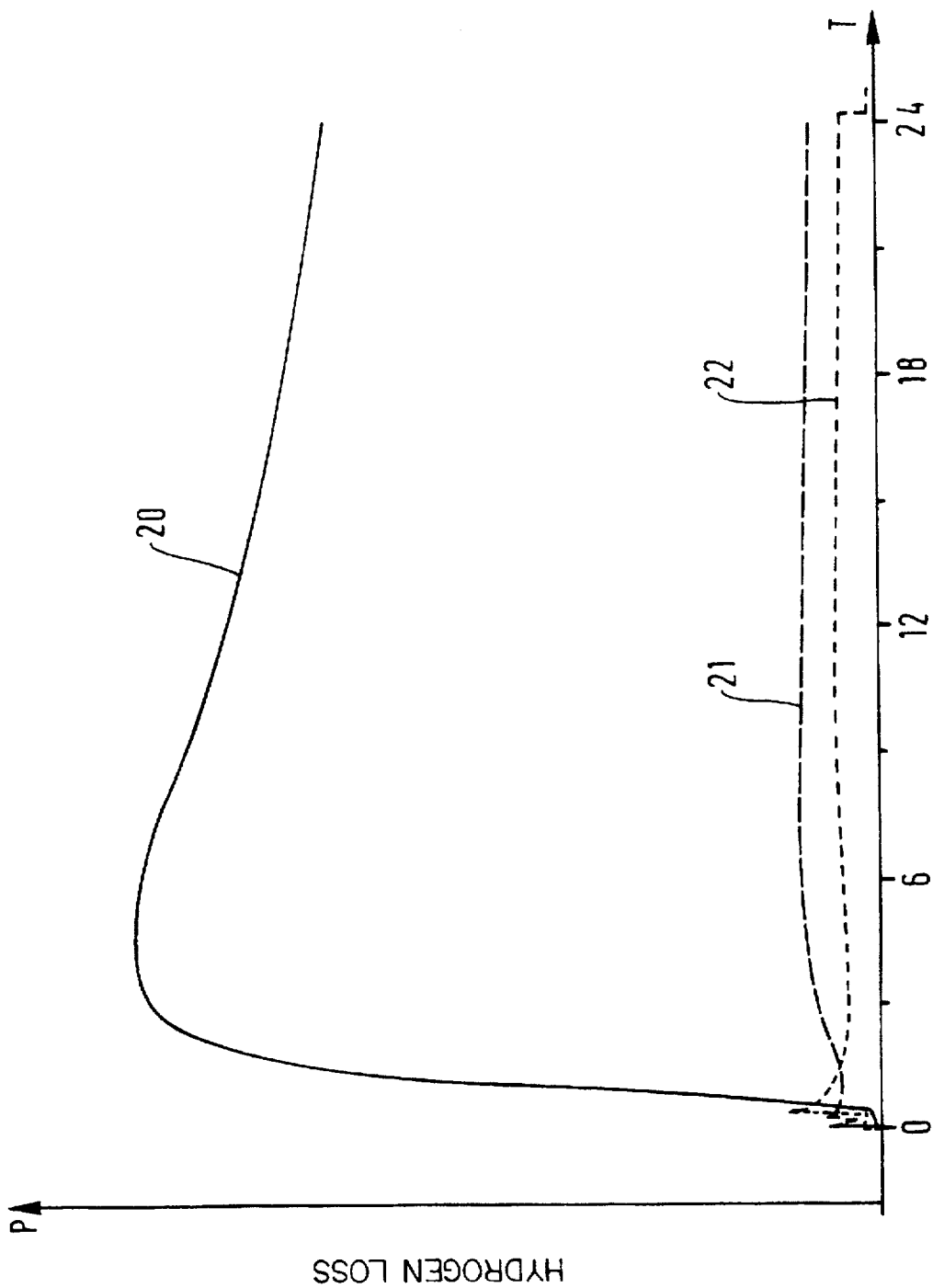
FIG. 2 shows hydrogen loss P in relative units as a function of time T in hours, for the material of the invention in comparison with PP and with PA 11.

FIG. 2 shows that hydrogen permeability was respectively 124×10$^{-5}$ mbar 0.1/sec for PP (curve 20) and 8.25×10$^{-5}$ mbar 0.1/sec for PA 11 (curve 21). Curve 22 in FIG. 2 shows the hydrogen leakage for the material of the invention as sold under the trademark "ORGALLOY" and the reference "LE 6000": its hydrogen permeability was 1.96×10$^{-5}$ mbar 0.1/sec, i.e. 62 times less than PP and four times less than PA 11.

Naturally, the present invention is not limited to the embodiments described and shown, and the invention can be modified in numerous ways by the person skilled in the art without departing from the spirit of the invention. Without going beyond the ambit of the invention, it is possible to use the same material for making the container of any type of one-piece battery or storage cell containing an alkaline electrolyte, in particular those in which the positive electrode is based on nickel such as those of the Ni/Cd, Ni/MH, or Ni/Fe types. The invention applies to any container made up of a plurality of parts that are heat-fused together by contact. By way of example, the container may comprise a case and a cover that are independent or a case serving as a cover with the bottom being applied thereto. It is also possible for the one-piece battery to include a cooling device that uses a cooling liquid, such as the device described in French patent application No. 2 697 678, for example, or indeed a centralized electrolyte filling system which is placed on the cover. One-piece batteries of the present invention may be interconnected to form assemblies of greater capacity.

We claim:

1. A sealed battery having an electrolyte, comprising a single container including compartments receiving storage cells comprising thermoplastic material, wherein said material comprises an alloy of at least two polymers comprising:

a proportion of not less than 50% by weight of the alloy of a first polymer selected from polyamide 6 and polyamide 6—6; and a proportion of not more than 50% by weight of the alloy of a second polymer selected from polyethylene, polypropylene, and copolymers thereof;

said material having permeability to hydrogen no greater than 400 cm$^3$/m$^2$ 0.24 h, said permeability being measured at 25° C. on a film that is 100 μm thick under an absolute pressure of 2 bars, and in an atmosphere at 75% relative humidity.

2. A battery according to claim 1, in which the proportion of said first polymer lies in the range 50% to 80% by weight of the alloy.

3. A battery according to claim 1, in which the proportion of said second polymer lies in the range 20% to 50% by weight of the alloy.

4. A battery according to claim 1, in which said material has permeability to oxygen no greater than 150 cm$^3$/m$^2$ 0.24 h, said permeability being measured at 25° C. on a film that is 100 μm thick under an absolute pressure of 2 bars, and in an atmosphere at 75% relative humidity.

5. A battery according to claim 1, in which said first polymer is polyamide 6 and said second polymer is polypropylene.

6. A battery according to claim 1, in which the breaking force perpendicular to the bond of said material to itself as obtained by contact heat-fusion, is not less than 1.34±0.4 kN measured on a test piece having a thickness of 2 mm, a width of 20 mm, and a length of about 200 mm.

7. A battery according to claim 1, wherein said single container is made from at least two mutually-cooperating parts which are bonded together by contact heat-fusion.

* * * * *

UNITED STATES PATENT AND TRADEMARK OFFICE
CERTIFICATE OF CORRECTION

PATENT NO.: 5,800,945
DATED: September 1, 1998
INVENTOR(S): Tristan GRIVEL, Roelof VERHOOG It is certified that error(s) appears in the above-identified patent and that said Letters Patent is hereby corrected as shown below:

Column 1, after the "Title of the Invention", but before the "Background of the Invention", insert --The Government of the United States of America has rights in this invention pursuant to Cooperative Agreement No. DE-FC02-91CE50336 awarded by the U.S. Department of Energy--.

Signed and Sealed this

Twenty-seventh Day of March, 2001

*Attest:*

NICHOLAS P. GODICI

*Attesting Officer*    *Acting Director of the United States Patent and Trademark Office*